United States Patent [19]

Wilson

[11] 4,124,488
[45] Nov. 7, 1978

[54] WATER PURIFICATION BY REVERSE OSMOSIS

[75] Inventor: Leslie P. S. Wilson, Nassau, The Bahamas

[73] Assignee: Ocean Water Limited, Nassau, The Bahamas

[21] Appl. No.: 771,464

[22] Filed: Feb. 24, 1977

[30] Foreign Application Priority Data

Feb. 27, 1976 [GB] United Kingdom ............... 7854/76
Apr. 21, 1976 [GB] United Kingdom ............. 16157/76
Aug. 12, 1976 [GB] United Kingdom ............. 33621/76

[51] Int. Cl.² ..................... B01D 13/00; C02B 1/82
[52] U.S. Cl. ..................... 210/134; 210/136; 210/137; 210/138; 210/321 R; 210/416 M; 210/433 M; 417/465
[58] Field of Search ......... 210/416 M, 433 M, 321 R, 210/138, 137, 134, 136; 417/555 R, 251, 500, 464, 465, 395, 492; 55/163

[56] References Cited

U.S. PATENT DOCUMENTS

| 1,909,145 | 5/1933 | Berenbruch | 417/395 |
| 2,982,309 | 5/1961 | Read | 210/138 |
| 3,168,872 | 2/1965 | Pinkerton | 417/492 |
| 3,246,604 | 4/1966 | Brailsford | 417/465 |
| 3,489,159 | 1/1970 | Cheng et al. | 137/14 |
| 3,493,495 | 2/1970 | Mendelson | 210/321 A |
| 3,498,910 | 3/1970 | Mendelson | 210/321 A |
| 3,598,238 | 8/1971 | Collins | 210/138 |
| 3,825,122 | 7/1974 | Taylor | 210/134 |
| 4,008,003 | 2/1977 | Pinkerton | 417/251 |
| 4,037,616 | 7/1977 | Pinkerton | 417/250 |
| 4,054,522 | 10/1977 | Pinkerton | 210/321 B |

OTHER PUBLICATIONS

"Development of Flow Work Exchangers for Energy Recovery in Reverse Osmosis Plants" Gilbert et al., Dept. of Interior, Off. of Saline Water, Report 680.
"Flow Work Exchanger" Cheng et al., Aiche Journal, May, 1967, pp. 438–442.
"Flow Work Exchanger For Desalinization Processes" from the Office of Saline Water, Report 357, 1968.

Primary Examiner—Frank A. Spear, Jr.
Assistant Examiner—David R. Sadowski
Attorney, Agent, or Firm—Mawhinney & Mawhinney & Connors

[57] ABSTRACT

Apparatus for reverse osmosis purification of water or other fluid by passing the fluid under pressure across a membrane, through which membrane a part of the fluid passes in purified form, makes use of a piston or diaphragm pump in which the front face of the piston or diaphragm is used to force the fluid from one end of a cylinder into the module and in which the return fluid is applied to the rear face of the piston or diaphragm so that the pressures on the two faces are substantially balanced. The piston or diaphragm is operated by a piston rod attached to the rear face of the piston or diaphragm; the system is self-regulating to give an extraction ratio equal to the ratio of piston rod area to piston area.

20 Claims, 7 Drawing Figures

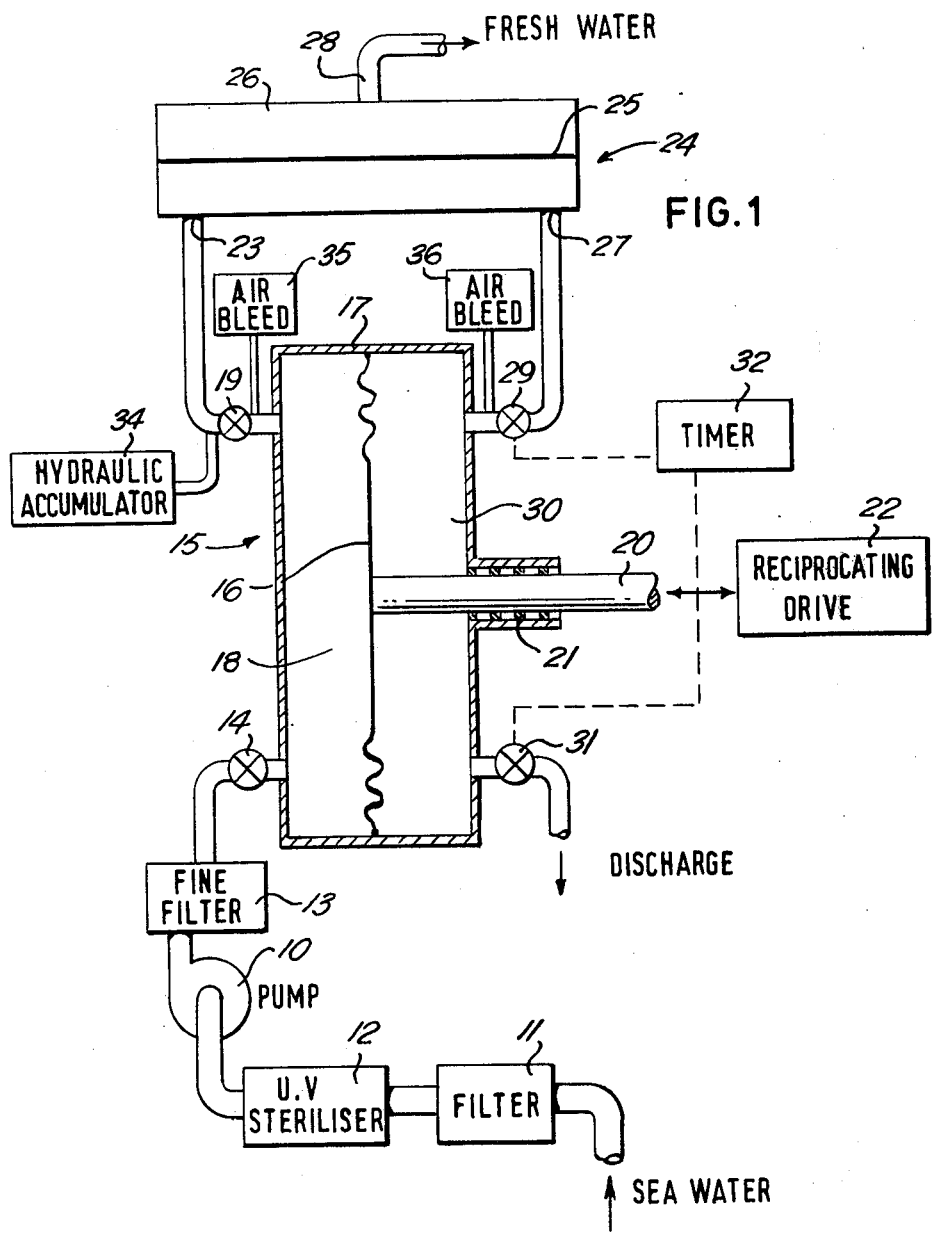

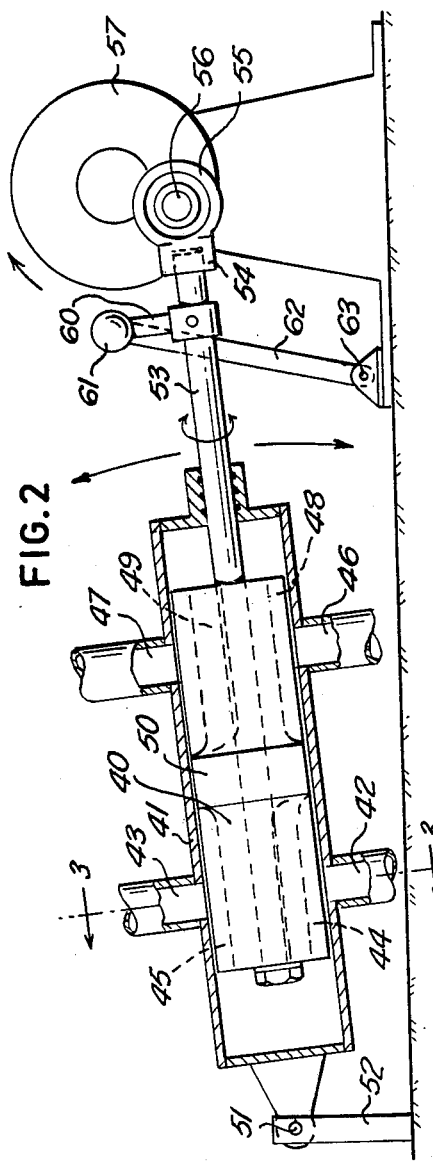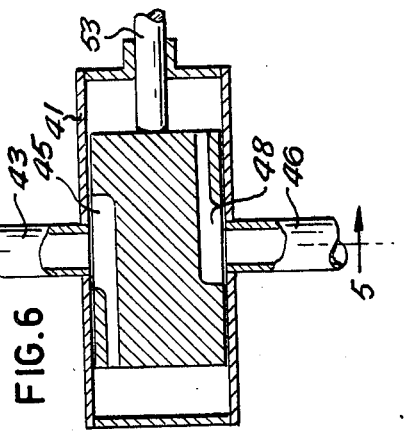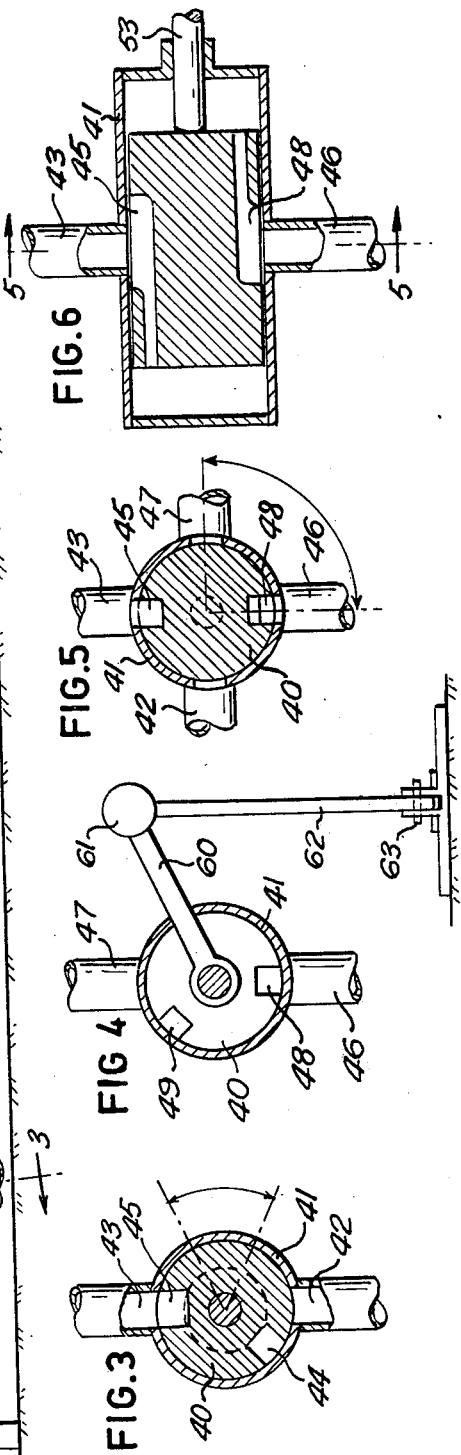

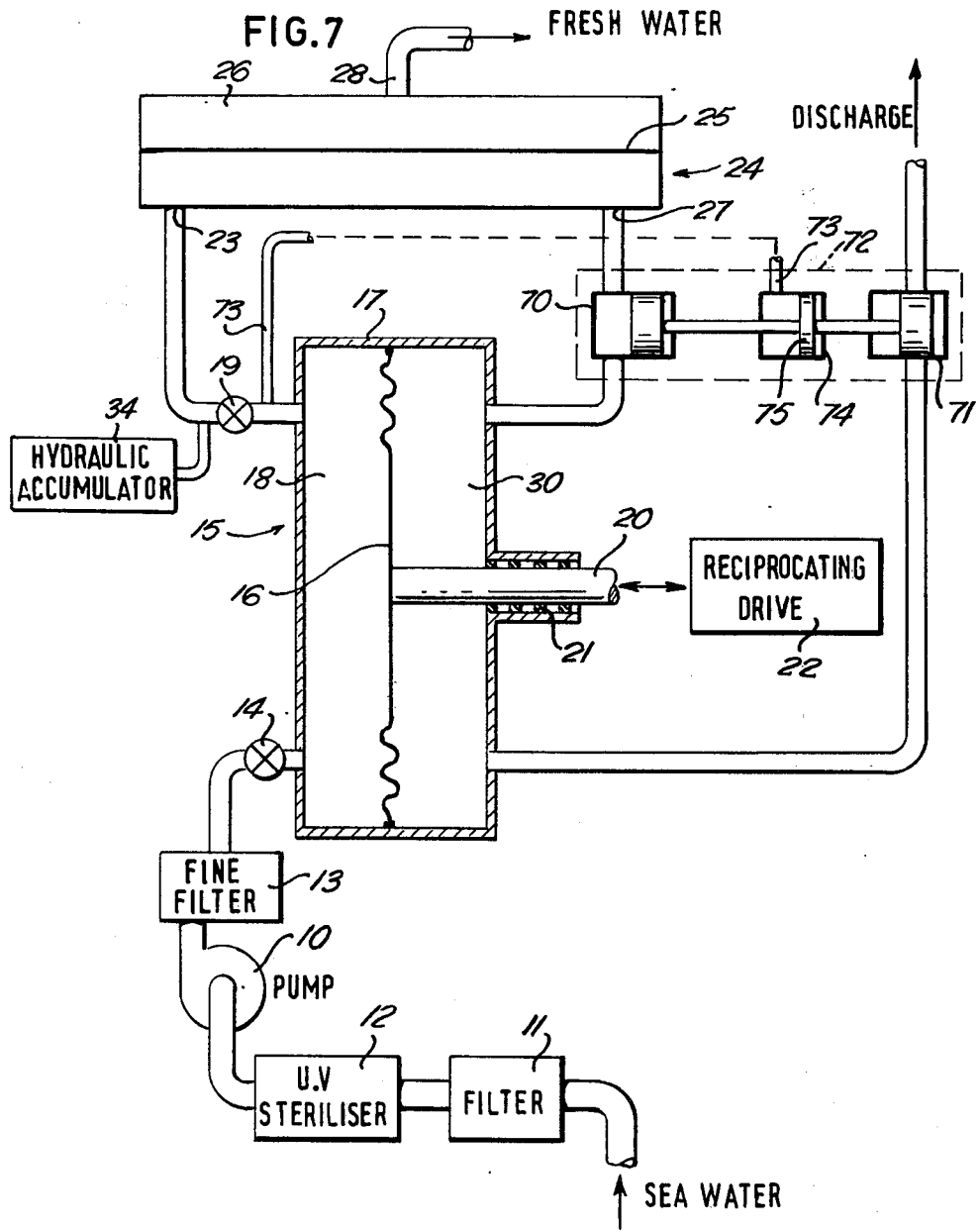

4,124,488

WATER PURIFICATION BY REVERSE OSMOSIS

BACKGROUND OF THE INVENTION

1. Field of the Invention

This invention relates to water purification by reverse osmosis.

2. Prior Art

Reverse osmosis is a process in which pressure is applied to a solution to force water from a solution through a semipermeable membrane so leaving a more concentrated solution to the inlet side. The pressure required has to be sufficient to overcome the osmotic pressure and hence becomes greater as the solution is more concentrated. For brackish water, a pressure of the order of 300–500 psi (2000–3500 $k$ Nm$^{-2}$) whilst for sea-water, since the osmotic pressure is higher, a pressure typically of 600–1000 psi (4000–7000 $k$ Nm$^{-2}$) might be necessary. One of the main problems restricting commercial use of this process is the high power consumption and hence high cost.

Apparatus for the reverse osmosis purification of water is described for example in U.S. Pat. Nos. 3,825,122; 3,449,245; 3,355,382; 3,637,081; 3,654,148; 3,707,231; 3,228,876 and 3,405,058. As is disclosed in these specifications, it has been appreciated that, with the high pressures involved, there is considerable waste of power unless use can be made of the pressure energy in the high pressure fluid which passes over the membrane, i.e. the unpurified water which has eventually to be discharged to waste. For example U.S. Pat. No. 3,405,058 makes use of a fluid motor driven by this high pressure fluid, which motor drives a pump used in the water purification system. U.S. Pat. No. 3,875,122 makes use of the high pressure fluid to act on a piston which in turn drives a piston used as a pump in the water purification system; the use of the very high pressures acting on the pistons raise sealing problems and such an arrangement requires synchronisation of the opening and closing of a large number of valves.

SUMMARY OF THE INVENTION

It is one of the objects of the present invention to provide an improved form of apparatus for reverse osmosis purification of water or other fluids.

According to this invention, apparatus for the reverse osmosis purification of water or other fluid comprises a module including an osmotic membrane, a fluid inlet and fluid outlet for passage of fluid through the module over one surface of the membrane and an outlet for passage of purified fluid out of the module from the opposite surface of the membrane, together with a ram having a piston or diaphragm in a cylinder for forcing fluid from the front face of the piston or diaphragm through a valve to the fluid inlet of the module, the ram having an operating rod extending outwardly from the rear face of the piston or diaphragm and means including a first controlled valve connecting said fluid outlet from the module to the cylinder to admit returned fluid onto the rear face of the piston or diaphragm and a second controlled valve to control discharge from the rear of the piston or diaphragm.

With this construction, fluid, e.g. sea-water is forced by the ram into the module. A valve is provided between the ram and the module to prevent return of fluid from the module on the return stroke of the ram; this may be a non-return valve or it may be a valve as described later, which is controlled by the fluid pressure or by the movement of the ram or in synchronism therewith, e.g. by a cam. On the forward stroke of the ram, some water may pass through the membrane and the remainder of the fluid is returned to the rear face of the piston or diaphragm.

Because of the presence of the operating rod, the area of the rear face of the piston is less than that of the front face and the swept volume at the rear of the piston is less than that at the front end. Because of this difference in swept volume, the pressure in the circuit from the front end of the cylinder through the feed water side of the reverse osmosis module to the rear end of the cylinder will increase. Preferably a hydraulic accumulator which may be gas or spring loaded is provided to permit the build-up of pressure to take place over a number of cycles. With each forward, i.e. pumping, stroke, provided such pressure is held back by the valves both into and out of the module during the return stroke, the pressure will increase steadily until a pressure is reached at which water will pass through the membrane on each stroke in equivalent volume to the difference in volume between the front and rear ends of the cylinder due to the presence of the operating rod. Power has to be applied to the operating rod but the required work for each stroke depends only on the difference of the front and rear face areas, the pressure and the length of stroke. The device is thus self-regulating and tends to operate in a condition where the proportion of water passing through the membrane to the total inlet fluid is equal to the ratio of the operating rod cross-section to the piston or diaphragm front face area. Thus there is no need for any pressure regulation by relief valves; the pressure is determined by the resistance of the feed water to passage through the membrane at the extraction ratio determined by the relative cross-sectional areas of the shaft and piston. No adjustment is required for variations of salinity and the same equipment may be used for sea water as for lightly brackish water. The power required to drive the piston will however vary with different waters. This power depends on the pressure and the cross-sectional area of the operating shaft as the pressures on the two faces of the piston are substantially in balance. The ram construction thus determines the percentage extraction of fresh water. This can be made quite low since the smaller the operating rod area, the less the input power which is required. Thus one can have a low extraction ratio without loss of efficiency.

The use of a low extraction ratio leads to further advantages. In conventional reverse osmosis equipment, the work input depends on the volume of fluid fed to the module and the pressure. A high extraction ratio is desirable to improve the efficiency. With a high extraction ratio, pretreatment of the input feedwater is required to reduce the possibility of membrane fouling by chemical precipitation. In addition to filtration, a typical form of treatment would be to chlorinate the feedwater for micro-organism control, add acid to adjust the pH down to about 5.5 (to prevent calcium carbonate scale forming on the membrane and to increase the efficiency of operation of the membrane) and add a scale inhibitor to prevent calcium sulphate precipitation. With the apparatus of the present invention, a low extraction ratio can be chosen which avoids precipitation problems and hence avoids any need to add acid or inhibitor. Micro-organism control can be effected by using ultra-violet radiation and thus there need be no chemical additions to the feedwater.

Because of the simplicity of the equipment and the high efficiency obtained despite the low extraction ratio, it becomes feasible to make a small unit, with a power consumption of only a few tens of watts, which would produce, from sea-water or brackish water, sufficient fresh water for use in a domestic house. Larger multi-cylinder arrangements may be employed for commercial use. Because the unit is inherently self-regulating, no complex monitoring or control system is required.

It will be more particularly noted however that in the construction described above, the pressures on the two sides of the piston or diaphragm are always kept almost equal. Necessarily they are not exactly equal but they are approximately balanced throughout the operating movement of the piston or diaphragm throughout both directions of stroke. This leads to very important advantages. Firstly, if a piston is employed, the problems of sealing the piston in the cylinder are very greatly reduced. In known types of reverse osmosis apparatus, as described for example, in the aforementioned specifications, the piston, on the operating stroke for forcing water at high pressures through the osmosis module, has to generate a very high pressure on its operating face and any leakage of water around the edge of the piston to the low pressure side will reduce the efficiency of operation. Use of a piston, in this way, with pressures substantially balanced on opposite faces and in which the sealing of the piston in the cylinder can therefore readily be effected, leads to the possibility of a very simple form of valve arrangement as will be described later. On the other hand, by using the above-described arrangement in which the pressures at the two ends of the cylinder are substantially balanced, it becomes possible to use a flexible diaphragm instead of a piston and thereby to avoid completely the problem of sealing the piston.

Considering firstly the use of a piston, simplification of the valve arrangement may be achieved by arranging the piston and cylinder to constitute the necessary controlled valves. For this purpose, in the above-described apparatus and in which the ram comprises a piston in a cylinder, said controlled valves may be constituted by ports in said cylinder co-operating with slots in the peripheral surface of the piston together with means for effecting relative rotation between the piston and cylinder so that the ports communicate with the cylinder via the slots during the required portions of the piston stroke. Each slot conveniently extends longitudinally parallel to the axis of the piston from a point along the length thereof to communicate with the appropriate end so as, when in an appropriate rotational and longitudinal position, to connect a port to the cylinder beyond the end of the piston. The slots however need not necessarily be straight and they need not extend to the end of the piston if other communicating means, e.g. apertures through the piston body are provided to give the required fluid path. It will thus be seen, that by appropriate shaping of the ports and slots, rotational oscillatory movement between the piston and the cylinder, controlled in synchronism with the axial movement of the piston with respect to the cylinder, can be arranged to give any required cyclic control of the opening and closing of ports.

It is convenient to turn the piston in the cylinder about the axis thereof in an oscillatory manner through a limited angle of rotation, for example one right angle or less. If the angular movement is limited to less than one right angle, it is possible to provide for example, for one end of the cylinder, four ports with co-operating slots, the ports being evenly spaced around the axis of the cylinder, the slots are leading directly or via apertures or bores in the piston to the appropriate end of the piston and cylinder assembly. Similarly four ports and slots might be provided for the other end of the piston. It is preferred however to provide two ports and slots for each end, the ports being evenly spaced about the axis of the cylinder and the slots leading directly or via apertures or bores in the piston to the respective ends of piston and cylinder assembly; in this case the slots for the two ends of the cylinder may overlap along the length of the piston thereby enabling a shorter piston to be used. The two high pressure ports connected to the inlet and outlet of the module can then be diametrically opposed to balance side thrust on the piston.

An arrangement as described above with two ports and slots for each end of the cylinder enables controlled timing of the opening of inlet and outlets for both ends of the cylinder to be obtained.

The piston may be driven via a rigid piston rod directly from a crankpin or eccentric, the cylinder being mounted so that it can oscillate angularly in the plane of movement of the crank, in a manner analogous to an oscillating cylinder reciprocating steam engine. In this case, rotation of the piston with respect to the cylinder may conveniently be effected by making the piston rod rotatable about its axis, e.g. by providing a rotatable coupling between the piston rod and the driving crank or eccentric and providing means for effecting rotation of the piston rod and piston in synchronism with the angular oscillatory movement of the piston and cylinder. For this purpose there may be provided an arm fixed to the piston rod and extending transversely thereto in a direction transverse to the plane of the oscillatory movement of the piston rod axis, which arm at a point remote from the piston rod, is connected by a universal joint and pivoted arm to a fixed point so that, as the piston rod oscillates transversely to its length, the arm causes the piston rod and hence the piston to oscillate angularly about the axis of the piston rod and cylinder. Means may be provided to ensure rapid rotation of the piston at the instants when valves are to be opened and closed.

Alternatively the cylinder may be fixed rigidly; in this case, a connecting rod may be provided between the driving crank or eccentric and the piston rod with cams or the like to rotate the piston. With a fixed cylinder, preferably external valves are provided, operated for example by a hydraulic linkage and cam timing device.

As previously mentioned, in some cases, it may be preferred to use a diaphragm instead of a piston in the cylinder. It is thus necessary to employ external valves. Such external valves may, of course, be used in an arrangement employing a piston or in an arrangement employing a diaphragm in the cylinder. The external valves may be spool, slide, ball or poppet or other types of valve. In one arrangement, means are provided for operatively controlling the inlet and outlet valves connecting the fluid inlet from the module to the rear end of the cylinder and the fluid outlet from the rear end of the cylinder to waste, which means are driven directly or indirectly by the fluid pressures controlling the nonreturn valves for the front end of the cylinder. By this construction, the inlet and outlet valves for the rear end of the cylinder are operated to open when the piston or diaphragm has reached one extremity of its stroke and are closed on or before the piston or diaphragm reaches the other extremity of its stroke.

The operation of the valves for the rear end of the cylinder may be effected mechanically, e.g. by cams or the like driven by or in synchronism with the piston or diaphragm or by mechanical coupling to the front end valves or to a control member operated by or in synchronism with those valves or it may be effected hydraulically, e.g. by having a valve control member driven by the appropriate fluid pressures. Very conveniently these fluid pressures are used to effect movement of a control piston in a valve cylinder.

It will be seen that, by this arrangement, it is readily possible to effect the necessary control of the valves controlling admission and discharge of fluid at the rear end of the ram cylinder.

BRIEF DESCRIPTION OF THE DRAWINGS

FIG. 1 is a diagram illustrating a reverse osmosis apparatus for the treatment of sea water constituting one embodiment of the invention;

FIG. 2 is a diagram illustrating a piston and cylinder assembly for a modified form of construction of reverse osmosis apparatus;

FIG. 3 is a transverse sectional view along the lines 3—3 of FIG. 2;

FIG. 4 is a diagram explaining part of the apparatus of FIG. 2;

FIGS. 5 and 6 are views similar to FIGS. 2 and 3 but showing only the piston and cylinder with inlet and outlet ports and illustrating a modification of the construction of FIGS. 2 to 4; and FIG. 7 illustrates a further modification of the apparatus of FIG. 1.

DESCRIPTION OF THE PREFERRED EMBODIMENTS

Referring to FIG. 1, an electrically driven pump 10 is arranged to draw sea-water through a filter 11 and an ultra-violet irradiation unit 12, which may be of known, commercially available, form. The sea-water from the pump is passed through a fine filter 13 and a non-return inlet valve 14 to a ram 15. In this embodiment, the ram comprises a diaphragm 16 for displacing fluid in a cylinder 17. The part 18 of the cylinder at the front of the diaphragm receives the sea-water from the inlet valve 14, the water being drawn in on movement of the central part of the diaphragm in one direction (to the right in the figure) and, on the return stroke, this water is forced out through a non-return outlet valve 19. The ram is operated by means of an operating rod 20 passing through a seal 21 and driven by a reciprocating drive 22, conveniently electrically powered.

From the outlet valve 19, the sea-water under pressure from the ram is fed to a fluid inlet 23 of a reverse osmosis module 24 which is shown diagrammatically as comprising a membrane 25 in a housing 26 with the fluid inlet 23 and a fluid outlet 27 on one side of the membrane and a fresh water outlet 28 on the other side of the membrane. This module may be constructed in the known manner, for example, having a sheet of membrane material (e.g. a cellulose acetate or polyamide material) wound spirally with a water conducting backing sheet around a perforated tube which receives the fresh water. The outlet pressure fluid from outlet 27 is fed through a controlled valve 29 to the rear end region 30 of the ram cylinder 17, i.e. the region at the rear of the diaphragm. This region 30 has an outlet valve 31, the valves 29 and 31 being controlled by a timer 32 driven in synchronism with the ram operation.

In operation, a rearward stroke of the ram diaphragm 16 causes fluid at the rear of the diaphragm to be discharged through valve 31 which is opened by the timer 32 during this rearward stroke. The valve 29 is closed during this rearward stroke. Sea-water sterilised in unit 12 is drawn into the front end of the cylinder 17 through valve 14. On the return stroke, valve 31 is closed and valve 29 open. The sea-water in part 18 of the cylinder is forced under pressure through the non-return valve 19 to the module 24. Part of the water passes through the membrane to provide fresh water at the outlet 28 and the remainder is returned through the valve 29 to the rear face of the diaphragm. The work done on this stroke depends on the force applied to the operating rod 20 and this force is essentially the output pressure acting over the area of the operating rod; the pressure drop in the module is quite small compared with the pressure in the fluid. As previously explained, the system is inherently self-regulating and will operate to extract a proportion of fresh water determined by the ratio of the operating rod section to the area of the diaphragm.

It will be noted that the pressure difference between the two faces of the diaphragm is small, being substantially only the pressure drop through the module. It is thus readily possible to use a diaphragm as described above although high pressures have to be applied to the water fed to the module. The smaller seal 21 around the operating rod has to withstand the higher pressure but it is readily possible to make a satisfactory seal for this purpose.

As thus far described, the full pressure in the system has to be developed during the first pumping stroke of the diaphragm. However, by providing a hydraulic accumulator 34 between the outlet valve 19 and the inlet 23 to the module 24, it is possible to build up the pressure gradually. This hydraulic accumulator may be spring or gas-loaded. During the first pumping stroke, if the developed pressure is not sufficient to cause any water to pass through the membrane 25, the hydraulic accumulator will hold the excess volume of water pumped and will retain it under pressure during the return stroke as valve 19 is closed. Thus the pressure can build up gradually until equilibrium conditions are reached in which the extraction ratio is equal to the ratio of the piston rod cross-section area to diaphragm area.

This hydraulic ram 34 also surfaces to cushion shock forces. Such cushioning however may be effected additionally or alternatively by providing an air bubble in the system, conveniently immediately at the outlet from the cylinder before the valve 19.

The substantial balance between the pressures at the two ends of the cylinder makes it readily possible however to use a piston in a cylinder as the ram, the balance between the pressures obviating the problems of sealing the piston with respect to the cylinder.

In FIGS. 2 to 4, there is illustrated diagrammatically a piston and cylinder assembly with drive therefor suitable for use on an apparatus for the reverse osmosis purification of water in place of the cylinder and diaphragm and the associated valves of the apparatus of FIG. 1.

Referring to FIGS. 2, 3 and 4, there is shown diagrammatically a piston 40 in a cylinder 41. For one end of the cylinder, there is an inlet port 42 and an outlet port 43. The inlet port 42 is for water to be purified and typically would be sea water or brackish water which, as described with reference to FIG. 1, may be filtered and possibly subjected to ultra-violet radiation. The outlet port 43 leads to one side of the diaphragm of a reverse osmosis module similar to the module 24 of FIG. 1. In this particular embodiment, the ports 42, 43 are diametrically opposite one another but they cooperate with slots 44, 45 respectively extending in the lengthwise direction of the piston in the peripheral surface thereof, these slots 44, 45, as shown in FIG. 3, being at positions not diametrically opposite one another so that slot 44 co-operates with port 42 in one angular position of the piston about the axis of the cylinder whilst port 43 co-operates with slot 45 in a different angular position of the cylinder. Similarly, for the other end of the piston there is a high pressure inlet port 46 and an outlet port 47. The high pressure inlet port is from the outlet from the high pressure side of the reverse osmosis module (outlet 27 of FIG. 1) whilst the outlet port 47 leads to waste. These two ports 46, 47 co-operate respectively with slots 48, 49 in the peripheral surface of the piston. These slots 48, 49 extend in the longitudinal direction of the piston and are angularly located so that, in one angular position of the piston with respect to the cylinder, the inlet port 46 is open to the right-hand end of the cylinder 40 whilst in a different angular position, the right-hand end of the cylinder is open to the outlet port 47. The external connections to each of ports 42, 43, 46 and 47 are effected through flexible pipes.

In the arrangement illustrated in FIG. 2, for clarity there is shown a central portion 50 of the piston which is cylindrical in section thereby separating the two ends of the cylinder. Also for clarity in the drawings, the inlet and outlet ports 42, 43, 46 and 47 have been shown aligned. In practice, however, it is convenient to arrange the various slots so that slots 48, 49 overlap slots 44, 45; the positions of the ports is determined by the required timing of the opening and closing of the various inlets and outlets. Such a construction is shown in FIGS. 5 and 6 which correspond respectively with FIGS. 2 and 3 and have the same reference characters to denote corresponding elements. An important advantage of such a construction is that with ports aligned on opposite sides of the piston, the pressure forces on the piston are better balanced. By arranging the inlet and outlet ports 42, 43 at one end of the cylinder in one plane and the inlet and outlet ports 46, 47 at the other end of the cylinder in a transverse plane, the piston 40 still effectively separates the two ends of the cylinder, even although the slots 44, 45 and 48, 49 overlap. This enables the length of the piston to be reduced compared with the arrangement diagrammatically illustrated.

In the arrangement illustrated, as shown in FIG. 2, the angular rotation of the piston in the cylinder is through a relatively small angle. In some cases, it may be preferred to effect a much larger rotation, e.g. 90° as shown in FIGS. 5 and 6, so that a single slot, in one angular position of the piston, co-operates with an inlet port and, in the other angular position of the piston, co-operates with an outlet port. A larger rotational movement helps in obtaining rapid opening and closing of the ports. The ports may readily be made of adequate size whilst having the opening and closing occurring only during the first or last few degrees of rotation.

The cylinder 41 (of FIGS. 2, 3 and 4 or FIGS. 5 and 6) may be mounted on trunnions, as in the manner well-known for oscillating cylinder steam engines, but, for convenience of explanation, the cylinder is shown hingedly mounted at 51 on a fixed post 52. The piston 40 is driven by a piston shaft 53 which is integral with or rigidly secured to the piston 40 and is connected by a rotatable coupling 54, permitting free rotation about the axis of the piston shaft, to a crank bearing 55 engaging a crank 56 or eccentric. This crank or eccentric would typically be driven through reduction gearing from an electric motor (not shown). FIG. 2 diagrammatically illustrates the crank 56 carried on a driving element 57. With this arrangement, the cylinder 41 can oscillate angularly in the plane of the paper, typically a vertical plane, and this oscillatory motion of the cylinder and corresponding motion of the piston and piston shaft is used to effect oscillatory angular motion of the piston within the cylinder. FIG. 4 is a diagram showing the piston 40 and the mechanism by which it is rotated in its cylinder. For this purpose, as shown in FIGS. 2 and 4, an arm 60 is rigidly secured to the piston shaft 53 to extend in a direction transverse to the plane of oscillatory motion of the piston shaft, preferably substantially at right angles thereto, this arm 60 being secured by a ball joint 61 to a link 62 which is hingedly secured at 63 to the base of the machine. As the piston shaft moves up and down, the arm 60 and link 62 cause the piston 40 to oscillate angularly about its longitudinal axis. The angular extent of this rotational oscillation is less than 90° and tyically might be of the order of 80°. The positions of the various slots 44, 45, 48 and 49 in the piston 10 are arranged so that, by this rotational oscillation, the slots 44, 45, 48, 49 and ports 42, 43, 46, 47 are interconnected at the appropriate times during the stroke of the piston.

It will be seen that with this construction, the required timed operation of valves for controlling inlets and outlets to the two ends of the piston and cylinder assembly is effected without having to provide any separate time-controlled mechanism driving valves, the necessary timing being effected by the angular oscillation of the piston in the cylinder. p Because the pressures on the two faces of the piston are approximately balanced, adequate seal between the piston and cylinder can be obtained relying on a relatively tight fit. The piston and cylinder preferably are formed of a graphite-filled material, e.g. a graphite-filled glass-fibre reinforced plastics material or a metal coated with such material.

FIG. 7 illustrates a modification of the apparatus of FIG. 1 in which fluid pressure is used for operating and controlling a valve system for the rear end of the cylinder. In FIG. 7, the same reference numerals are used as in FIG. 1 for indicating corresponding parts of the apparatus and in the following description, mention will only be made of the distinctive features of the construction of FIG. 7.

In FIG. 7, the outlet pressure fluid from the outlet 27 of the reverse osmosis module 24 is fed through a valve 70 to the region 30 in the ram cylinder 17 at the rear of the diaphragm. This region 30 has an outlet valve 71. The valves 70 and 71 are controlled in synchronism with the ram operation by a hydraulic control unit 72 which, in this construction, is illustrated as being operated by the fluid pressure in the front end of the ram. This fluid pressure is high when the ram is being driven to the left in the diagram and is lower when the ram is moving to the right to suck sea water into the front end of the diaphragm. This difference in fluid pressure is used to operate the hydraulic control unit. For this purpose, the fluid pressure at the outlet from the front end region 18 of the ram is applied via a duct 73 to module 74 having a drive piston 75 operated by the fluid pressure directly coupled to a movable piston valve which forms the aforementioned valves 70 and 71.

In operation a rearward stroke of the ram diaphragm 16 causes fluid at the rear of the diaphragm to be discharged through valve 71 which is open in this rearward stroke. Sea water from sterilising unit 12 is drawn into the front end of the cylinder 17 through valve 14. On the return stroke valve 71 is closed and valve 70 is open. The sea water in the part 18 of the ram cylinder is forced under pressure through the module 24. Part of it passes through the membrane to provide fresh water at the outlet and the remainder is returned to the rear face of the diaphragm. As previously explained with reference to FIG. 1, the work done on the pressure stroke depends on the force applied to the operating rod of the ram and this force is essentially the output pressure acting over the area of the operating rod. The pressure drop in the module is quite small compared with the pressure in the fluid. The system is inherently self-regulating and will operate to extract a proportion of fresh water determined by the ratio of the operating rod section to the area of the diaphragm.

In the construction of FIG. 7, as in FIG. 1, only one sliding seal is required, namely the seal 21 around the operating rod 20. Any leakage here does not affect the operation of the apparatus in that water would still be fed to the module under the required pressure although a higher input power would be required.

In all the above-described constructions, the reciprocating drive to the piston or diaphragm gives a pulsating pressure to the water fed to the reverse osmosis module. Such a pulsating drive is advantageous in that the flow pattern of the water across the surface of the osmotic membrane changes during the stroke, helping to break up boundary layers and to reduce the formation of chemical depositions. With this pulsating drive, however, it may be desirable to provide the hydraulic accumulator 34 or to maintain an air bubble in the system, preferably as close as possible to the pump in the high pressure outlet to the module, in order to cushion shock forces. The sea water however will generally contain dissolved air and it may be necessary to provide an air bleed, as shown at 35, 36 in FIG. 1, to let out air which has come out of solution. Conveniently such devices are provided for both ends of the cylinder, between the cylinder and the valves. Such air bleeds are known in themselves and may comprise, for example, sintered zinc elements which will let the air out but which will not allow water to pass.

I claim:

1. An apparatus for the reverse osmosis purification of water under high pressure comprising:
   (a) an elongated housing of the same cross-sectional size throughout its length and having a closed front end and a closed rear end;
   (b) a piston-like movable partition disposed transversely in the housing and separating the housing into two separate and non-communicating chambers, said partition having a front face and a rear face;
   (c) an actuating rod having an inner end portion connected to the rear face of the movable partition with the rod extending therefrom to the rear end of the housing and having an outer end portion sealingly slidably disposed through the rear end of the housing and power drive means operatively connected to the outer end portion for reciprocably moving the partition in the housing between the ends thereof;
   (d) said front face of the partition facing the front end of the housing and defining therewith a variable feed liquid chamber;
   (e) inlet means communicated with the feed chamber for supplying a supply of liquid, such as seawater, to the feed chamber;
   (f) valve means for said inlet means to prevent the return of supply liquid therethrough from the feed liquid chamber;
   (g) a reverse osmosis module comprising a housing divided by a semipermeable osmostic membrane, a separate liquid inlet and outlet in the housing on one side of the membrane and an outlet for fresh water in said housing on the other side of the membrane;
   (h) outlet means from the feed chamber separate from the inlet means and connected to the liquid inlet for the osmosis module housing;
   (i) valve means for said outlet means to prevent the return of liquid from the osmosis module housing to the feed chamber;
   (j) said rear face of the partition facing the rear end of the housing and defining therewith a variable return liquid chamber;
   (k) said partition being moved by the power drive means with the opposite faces thereof being under high liquid pressure and with substantially the same pressure existing on the opposite faces of the partition;
   (l) the rear face of the partition being of a cross-sectional area less than that of the front face to the extent of the cross-sectional area of the actuating rod with the ratio of such cross-sectional area of the actuating rod to the front face of the partition being substantially the same as the extraction ratio of the purified water to the supply liquid entering the feed liquid chamber and with said areas of said faces of the partition being in accordance with the extraction ratio so as to avoid a pressure difference across the partition.
   (m) a liquid connection between the outlet in the osmosis module housing and the return liquid chamber and communicating said outlet with the return liquid chamber so that return from the osmosis module housing is applied to the rear face of the partition;
   (n) first valve means allowing the flow of the return liquid from said outlet into the return liquid chamber as the partition is moved by the actuating rod toward the front end of the housing to force the supply liquid into the osmosis module housing;
   (o) outlet means from the return liquid chamber for the discharge therefrom of return liquid;
   (p) second valve means allowing the flow of the return liquid through said outlet means as the partition is moved rearwardly in the housing and supply liquid enters the feed chamber; and,
   (q) control means controlling the alternate opening and closing of the first and second valve means in accordance with the movement of the partition toward the ends of the housing whereby the partition circulates the supply liquid through the osmosis module housing on each forward stroke, with the high pressure being approximately balanced on opposite faces of the partition throughout the operating movements of the partition, and on the return stroke draws fresh supply liquid into the feed chamber and passes the return liquid from the return chamber thus ensuring that the pressures on the opposite faces of the partition are substantially balanced.

2. The apparatus of claim 1 wherein said control means includes a timer operated in synchronism with the forward and rearward movements of the partition in the housing.

3. The apparatus of claim 1 wherein said control means includes means operatively responsive to liquid pressure in the feed liquid chamber to open the first valve means and close the second valve means on the forward movement of the partition toward the front end of the housing and to close the first valve means and open the second valve means on the rearward movement of the partition toward the rear end of the housing.

4. The apparatus of claim 1 wherein said housing is a cylinder and said partition is a piston working therein and said first and second valve means are comprised of angularly related slots in the peripheral surface of the piston and cooperating ports in said cylinder and said control means includes means for rotating said piston in the cylinder as it is reciprocated in the cylinder so as to selectively communicate the ports and slots.

5. Apparatus as claimed in claim 4 wherein each slot extends longitudinally parallel to the axis of the piston from a point along the length thereof to communicate with the appropriate end so as, when in an appropriate rotational and longitudinal position, to connect a port to the cylinder beyond the end of the piston.

6. Apparatus as claimed in claim 4 wherein the means for effecting relative rotation between the piston and the cylinder comprises means for rotationally oscillating the piston in the cylinder about the axis thereof through a limited angle of rotation.

7. Apparatus as claimed in claim 6 wherein said limited angle of rotation is one right angle.

8. Apparatus as claimed in claim 6 wherein the means for effecting rotation of the piston is arranged to effect a rotation of less than 90° and wherein, for each end of the piston, four ports are provided with respective cooperating slots, the ports being evenly spaced around the axis of the cylinder, the slots leading directly or via apertures or bores in the piston to the respective ends of the piston and cylinder assembly.

9. Apparatus as claimed in claim 6 wherein, for each end of the piston, two ports and one slot are provided, the ports being 90° apart about the axis of the cylinder and the slots leading directly or via apertures or bores in the piston to the respective ends of the piston and cylinder assembly.

10. Apparatus as claimed in claim 9 wherein the slots for the two ends of the cylinder overlap along the length of the piston.

11. Apparatus as claimed in claim 10 wherein the two ports in the cylinder connected to the inlet and outlet of the module are diemetrically opposite one another.

12. Apparatus as claimed in claim 4 and wherein means for reciprocatingly driving said piston comprise a rigid piston rod driven directly from a crankpin or eccentric, and wherein the cylinder is mounted so that it can oscillate angularly in the plane of movement of the crank.

13. Apparatus as claimed in claim 12 wherein said means for effecting rotation of the piston with respect to the cylinder comprise a rotatable coupling between the piston rod and the driving crank or eccentric and means for effecting rotation of the piston rod and piston in synchronism with the angular oscillatory movement of the piston and cylinder.

14. Apparatus as claimed in claim 13 wherein, for effecting rotation of the piston rod, there is provided an arm fixed to the piston rod and extending transversely thereto in a direction transverse to the plane of the oscillatory movement of the piston rod axis, which arm at a point remote from the piston rod, is connected by a universal joint and pivoted arm to a fixed point so that, as the piston rod oscillates transversely to its length, the arm causes the piston rod and hence the piston to oscillate angularly about the axis of the piston rod and cylinder.

15. An apparatus for the reverse osmosis purification of water under high pressure comprising:
(a) an elongated housing of the same cross-sectional size throughout its length and having a closed front end and a closed rear end;
(b) a piston-like movable partition disposed transversely in the housing and separating the housing into two separate and non-communicating chambers, said partition having a front face and a rear face;
(c) an actuating rod having an inner end portion connected to the rear face of the movable partition with the rod extending therefrom to the rear end of the housing and having an outer end portion sealingly slidably disposed through the rear end of the housing and power drive means operatively connected to the outer end portion for reciprocably moving the partition in the housing between the ends thereof;
(d) said front face of the partition facing the front end of the housing and defining therewith a variable feed liquid chamber;
(e) inlet means including a non-return valve communicated with the feed chamber for supplying a supply of liquid, such as seawater, to the feed chamber;
(f) a reverse osmosis module comprising a housing divided by a semipermeable osmostic membrane, a separate liquid inlet and outlet in the housing on one side of the membrane and an outlet for fresh water in said housing on the other side of the membrane;
(g) outlet means including a non-return valve from the feed chamber separate from the inlet means and connected to the liquid inlet for the osmosis module housing;
(h) said rear face of the partition facing the rear end of the housing and defining therewith a variable return liquid chamber;
(i) said partition being moved by the power drive means with the opposite faces thereof being under high liquid pressure and with substantially the same pressure existing on the opposite faces of the partition;
(j) the rear face of the partition being of a cross-sectional area less than that of the front face to the extent of the cross-sectional area of the actuating rod with the ratio of such cross-sectional area of the actuating rod to the front face of the partition being substantially the same as the extraction ratio of the purified water to the supply liquid entering the feed liquid chamber.

(k) a liquid connection between the outlet in the osmosis module housing and the return liquid chamber and communicating said outlet with the return liquid chamber so that return liquid from the osmosis module housing is applied to the rear face of the partition;

(l) first valve means allowing the flow of the return liquid from said outlet into the return chamber as the partition is moved by the actuating rod toward the front end of the housing to force the supply liquid into the osmosis module housing;

(m) outlet means from the return liquid chamber for the discharge therefrom of return liquid.

(n) second valve means allowing the flow of the return liquid through said outlet means as the partition is moved rearwardly in the housing and supply liquid enters the feed liquid chamber; and, (o) means operatively responsive to liquid pressure in the feed liquid chamber and return liquid chamber of the housing controlling the alternate opening and closing of the first and second valve means in accordance with the movement of the partition towards the ends of the housing so as to open the first valve means and close the second valve means on the forward stroke of the partition and to close the first valve means and open the second valve means on the rearward stroke of the partition.

16. The apparatus of claim 15, wherein said housing is a cylinder and said partition is a flexible diaphram sealingly disposed diametrically in the cylinder so as to define the two liquid chambers on opposite sides of the diaphram.

17. The apparatus of claim 15 wherein said last means (o) includes a hydraulic control unit operated by the fluid pressure.

18. The apparatus of claim 15 wherein the first and second valve means are cooperating valve members operated by the fluid pressure of the fluid in the feed fluid chamber.

19. The apparatus of claim 15 wherein the first and second valve means are valve members arranged for cooperative movements responsive to differences of liquid pressure.

20. The apparatus of claim 15 wherein said first and second valve means are composed of movable piston valves interconnected by a piston rod having a drive piston operated by the high liquid pressure.

* * * * *